United States Patent
Oesterheld et al.

(10) Patent No.: US 8,976,555 B2
(45) Date of Patent: Mar. 10, 2015

(54) CONVERTER

(71) Applicant: ALSTOM Technology Ltd, Baden (CH)

(72) Inventors: Joerg Oesterheld, Oberrohrdorf (CH); Thierry Lecomte, Offemont (FR); René Wilhelm Schaefer, Suhr (CH)

(73) Assignee: Alstom Technology Ltd, Baden (CH)

( * ) Notice: Subject to any disclaimer, the term of this patent is extended or adjusted under 35 U.S.C. 154(b) by 83 days.

(21) Appl. No.: 13/705,631

(22) Filed: Dec. 5, 2012

(65) Prior Publication Data

US 2013/0148395 A1 Jun. 13, 2013

(30) Foreign Application Priority Data

Dec. 7, 2011 (EP) ...................................... 11290569

(51) Int. Cl.
*H02J 1/10* (2006.01)
*H02M 7/48* (2006.01)
*H02M 5/27* (2006.01)

(52) U.S. Cl.
CPC ................ *H02M 7/48* (2013.01); *H02M 5/271* (2013.01)
USPC ................ 363/65; 363/10; 363/149; 363/159

(58) Field of Classification Search
USPC ........... 363/9, 10, 36, 65, 123, 135, 136, 148, 363/149, 150, 152, 159, 160, 161
See application file for complete search history.

(56) References Cited

U.S. PATENT DOCUMENTS

| | | | | |
|---|---|---|---|---|
| 3,659,168 | A | * | 4/1972 | Salihi et al. .................... 318/800 |
| 3,702,429 | A | | 11/1972 | Sawyer et al. |
| 7,460,377 | B2 | | 12/2008 | Lacaze |
| 2008/0055953 | A1 | | 3/2008 | Lacaze |
| 2008/0290845 | A1 | | 11/2008 | Holveck et al. |
| 2012/0182774 | A1 | * | 7/2012 | Boecker et al. .................. 363/95 |

FOREIGN PATENT DOCUMENTS

DE 1488204 A1 1/1969

OTHER PUBLICATIONS

Hagmann, R. (ed.), "AC-cycloconverter drives for cold and hot rolling mill applications", Proceedings of the Industry Applications Society Annual Meeting, Sep. 28, 1991, pp. 1134-1140, IEEE, New York, US.

Hussels, P. et al., "Synthesis of cycloconverter and current-source-interter presentation of a new-control strategy", Proceedings of the European Conference on Power Electronics and Applications, Sep. 13, 1993, pp. 33-38, IEE, London, GB.

Zein El Din, A.S. et al., "32 bits high performance single chip microcontroller MC68332 for the control of cycloconverter", Proceedings of the European Conference on Power Electronics and Applications, Sep. 13, 1993, pp. 53-58, IEE, London, GB.

Office Action issued on Dec. 4, 2013, by the German Patent office in corresponding German Patent Application No. 10 2012 023 827.4. (8 pages).

* cited by examiner

*Primary Examiner* — Nguyen Tran
(74) *Attorney, Agent, or Firm* — Buchanan Ingersoll & Rooney PC

(57) ABSTRACT

A converter has converting groups with a first stage connected to input lines thereof and a second stage connected to output lines. The first and second stages have positive and negative branches that are connected together.

10 Claims, 3 Drawing Sheets

CONVERTER

INCORPORATION BY REFERENCE

The following documents are incorporated herein by reference as if fully set forth: European Patent Application No. 11290569.0, filed Dec. 7, 2011.

FIELD OF INVENTION

The present disclosure relates to a converter; in particular the disclosure refers to a converter with static switches that can be connected between an electric generator and an electric grid, to adapt the electric power generated at the electric generator to the requirements of the grid.

BACKGROUND

U.S. Pat. No. 7,460,377 discloses (with reference to FIGS. 1 and 2) a converter 1 comprising fifteen input lines 2 connected to three output lines 3 and comprising five converting groups 4. Each of the five converting groups 4 comprises a first converting stage 5 with switches connected to the input lines 2, and a second converting stage 6 with switches connected to the output lines 3. For each converting group 4, all the switches of the first stage 5 are connected to all the switches of the second stage 6. The switches are bidirectional switches driven by a control system.

This converter has some drawbacks. In fact, during operation, the control system must avoid that input lines of the same converting group 4 are operated at different polarities; in other words it must be avoided that, for a converting group, an input line for example 2a is fed with positive input voltage and another input line for example 2b is fed with a negative voltage and the switches of both input lines 2a and 2b conduct, because this would cause a short circuit.

With reference to FIG. 2, for safety reasons when switching from a positive voltage to a negative voltage or vice versa a safety zone 8 at 0 voltage is provided.

For this reason, the voltage (and in particular its harmonics) at the output lines is not fully optimized according to the needs and the control system and the software that implements it can be complicated.

SUMMARY

An aspect of the present disclosure thus includes providing a converter by which the voltage (and in particular the harmonics of the voltage) can be optimized in accordance with the needs, with less constrains than when using known converters.

Another aspect of the disclosure is to provide a converter by which the control system that drives the switches and the software that implements it are simpler when compared to those needed with known converters.

These and further aspects are attained by providing a converter in accordance with the accompanying claims.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
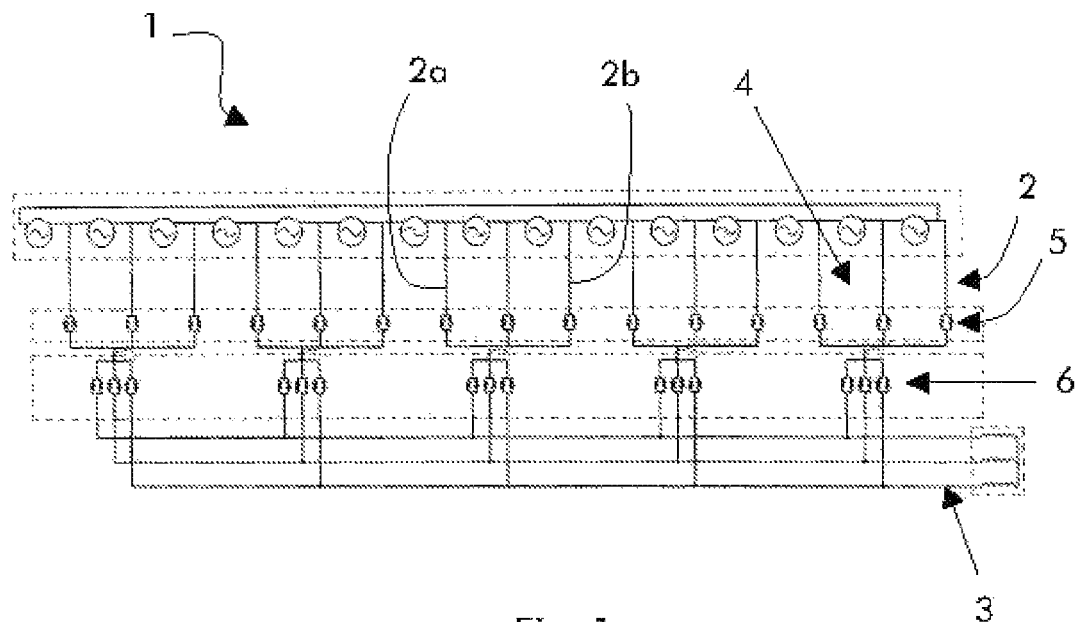
FIG. 1 is a schematic view of a known converter.
Figure 2:
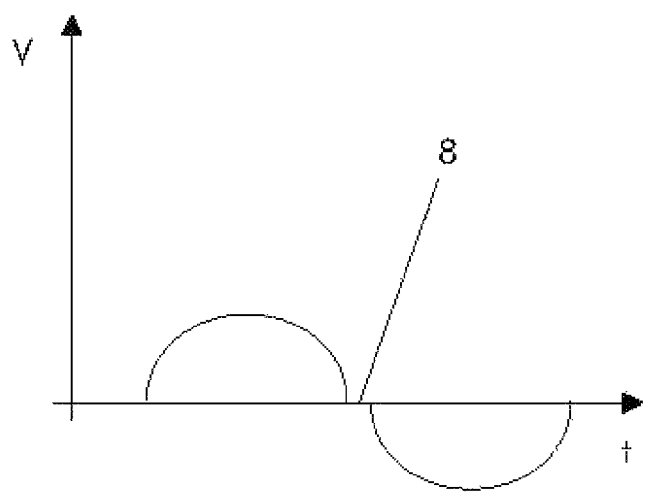
FIG. 2 shows the relationship voltage/time at a switching for a known converter.
Figure 3:
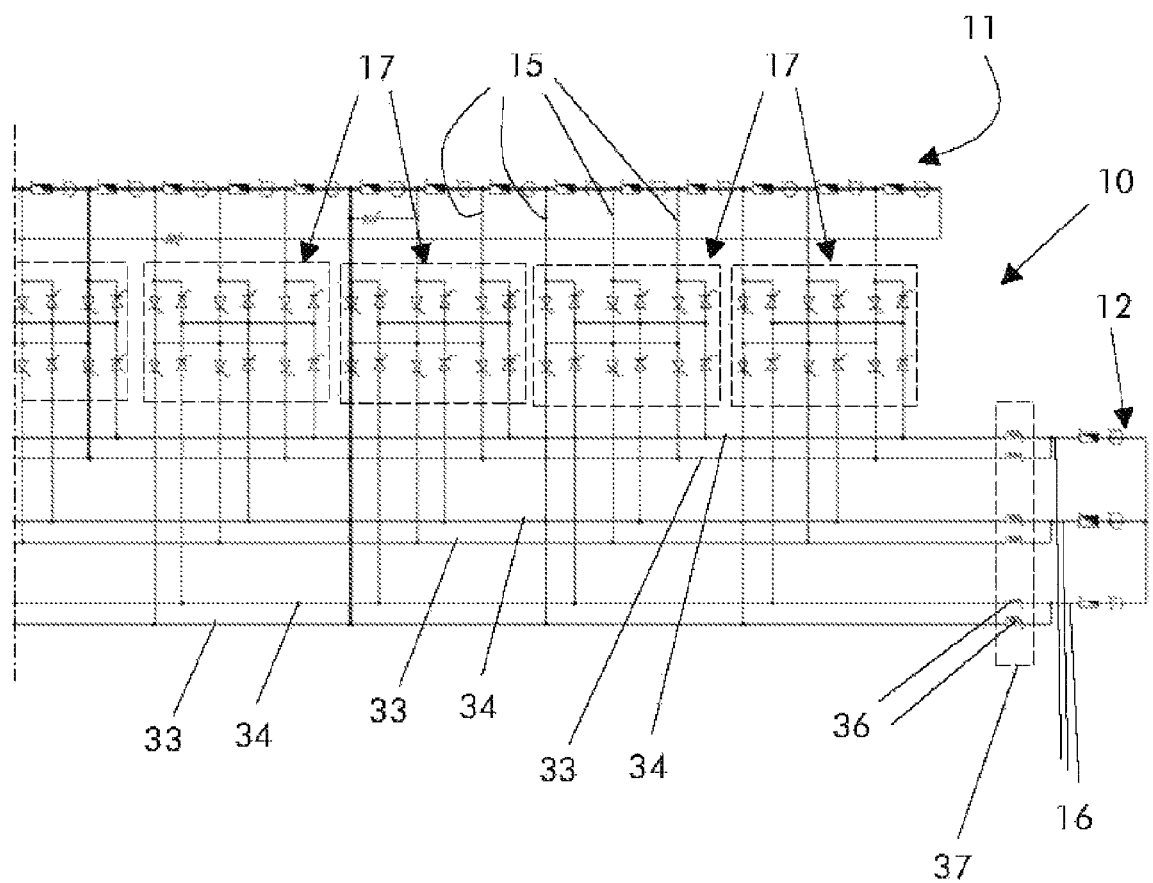
FIG. 3 is a schematic view of a converter in an embodiment of the present disclosure.
Figure 4:
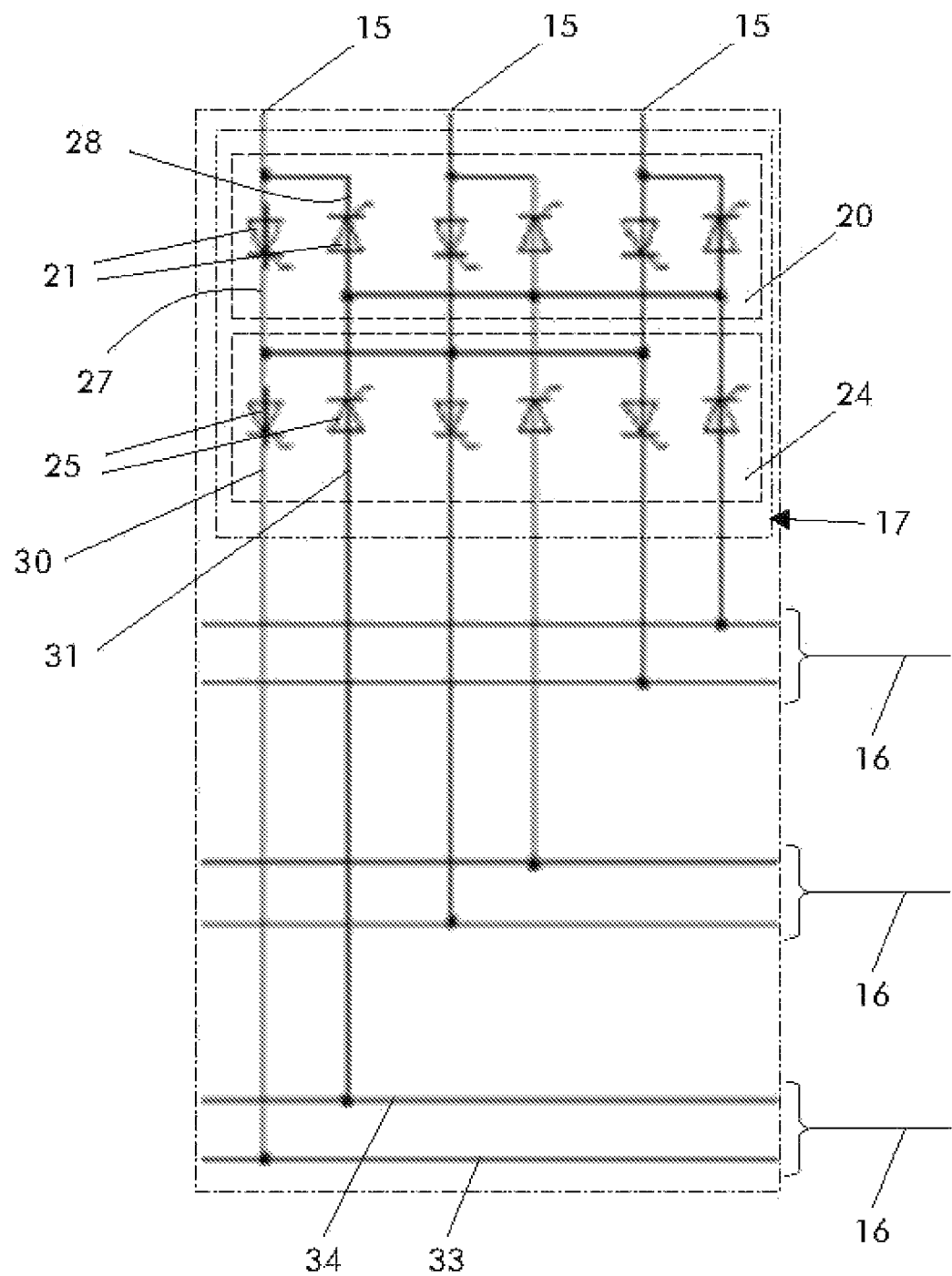
FIG. 4 is an enlarged part of FIG. 3.

With reference to the figures, which show a converter 10 connected between an electric generator 11 and an electric grid 12, such that the electric generator 11 generates electric power that the converter 10 adapts to the requirements of the electric grid 12.

The converter 10 has A input lines 15 connected to B output lines 16 and comprises A/B converting groups 17. A is greater than B; for example, the converter can have the following structure:

A=15, B=3, A/B=5.

In this case the converter 10 has fifteen input lines 15, three output lines 16 and five converting groups 17. The parameters above are only exemplary and also different parameters can be used.

Each converting group 17 is connected to B input lines (in the example it is connected to three input lines 15) and to all the B output lines 16.

In addition, each converting group 17 comprises a first converting stage 20 with switches 21 connected to each of the B input lines 15, and a second converting stage 24 with switches 25 connected to each of the B output lines 16.

The switches 21 of the first stage 20 are connected to the switches 25 of the second stage 24.

The first stages 20 include positive branches 27 connected to each input line 15 of the converting group 17, the positive branches having switches 21 that are arranged to conduct under a positive polarity (i.e. when the corresponding input line 15 has a positive voltage).

The first stages 20 also include negative branches 28 connected to each input line 15 of the converting group 17, the negative branches 28 having switches 21 that are arranged to conduct under a negative polarity (i.e. when the corresponding input line has a negative voltage).

The second stages 24 include positive branches 30 connected to each output line 16, the positive branches having switches 25 that are arranged to conduct under a positive polarity (i.e. when at least an input line of the group 17 has a positive voltage).

The second stages 24 also include negative branches 31 connected to each output line 16, the negative branches 31 having switches 25 that are arranged to conduct under a negative polarity (i.e. when at least an input line of the group 17 has a negative voltage).

In addition, for each converting group 17 each positive branch 27 of the first stage 20 is connected to all the positive branches 30 of the second stage 24.

Likewise, each negative branch 28 of the first stage 20 is connected to all the negative branches 31 of the second stage 24.

As shown, the positive branches 27 of the first stages 20 of each converting group 17 are separate from the negative branches 28 of the first stage 20 of each converting group 17.

Likewise, the positive branches 30 of the second stages 24 of each converting group 17 are separate from the negative branches 31 of the second stage 24 of each converting group 17.

Each output line 16 can be connected to a first conductor 33 connected to the positive branches 30 of the second stages 24, and to a second conductor 34 connected to the negative branches 31 of the second stages 24.

In addition, one between the first and the second conductor 33, 34 or both the conductors 33, 34 can have an inductance 36. These inductances 36 can be used to limit the circulating currents; anyhow the inductances 36 are optional.

The switches 21 and 25 are electronic switches such as thyristors (or transistors) or IGBT or GTO or IGCT.

The connection of the output lines 16 to the grid 12 can be achieved via a transformer 37.

The operation of the converter is apparent from that described and illustrated and is substantially the following.

The input lines 15 are supplied with different voltages from one another.

When all the input lines 15 of a converting group 17 are fed with a positive voltage, only the positive branches 27 of the first stage 20 operate to supply voltage to the positive branches 30 of the second stage 24.

The voltage from each of the positive branch 27 of the first stage 20 is supplied to each of the positive branches 30 of the second stage 24.

From the positive branches 30 of the second stage 24 the voltage is supplied to the output lines 16.

When all the input lines 15 of a converting group 17 are fed with a negative voltage the operation is similar (naturally the positive branches are replaced by the negative branches).

When some input lines 15 are fed with a positive voltage and some with a negative voltage the operation is still similar to the one already described. In this case the operation can still occur without problems and without any risk of short circuits, because of the separate positive branches 27, 30 and negative branches 28, 31 that prevent interferences between the positive and negative voltages.

Since for each converting group 17 the positive branches 27 of the first stage 20 are only connected to the positive branches 30 of the second stage 24 and likewise the negative branches 28 of the first stage 20 are only connected to the negative branches 31 of the second stage 24, no interference or short circuits between the positive branches 27, 30 and the negative branches 28, 31 can occur; this allows a simpler control system (in particular software) to drive the switches.

Naturally the features described may be independently provided from one another.

In practice the materials used and the dimensions can be chosen at will according to requirements and to the state of the art. It is understood, therefore, that this invention is not limited to the particular embodiments disclosed, but is intended to cover all modifications which are within the spirit and scope of the invention as defined by the appended claims; the above description; and/or shown in the attached drawings.

REFERENCE NUMBERS 1 converter
2, 2a, 2b input lines
3 output lines
4 converting group
5 converting stage
6 converting stage
8 safety zone
10 converter
11 electric generator
12 electric grid
15 input lines
16 output lines
17 converting groups
20 converting stage
21 switches
24 converting stage
25 switches
27 positive branch of 20
28 negative branch of 20
30 positive branch of 24
31 negative branch of 24
33 first conductor
34 second conductor
36 inductance
37 transformer

What is claimed is:

1. A converter comprising a number A of input lines and a number B of output lines, the converter further comprising A/B converting groups, each converting group being connected to the number B of input lines and comprising:
    a first converting stage comprising switches connected to each of the input lines of the converting group,
    a second converting stage comprising switches connected to each of the number B of output lines, wherein the switches of the first converting stage are connected to the switches of the second converting stage, the first converting stage includes:
    positive branches connected to each input line of the converting group, the positive branches having switches that are arranged to conduct under a positive polarity, and
    negative branches connected to each input line of the converting group, the negative branches having switches that are arranged to conduct under a negative polarity, the second converting stages includes:
    positive branches connected to each output line, the positive branches having switches that are arranged to conduct under a positive polarity, and
    negative branches connected to each output line, the negative branches having switches that are arranged to conduct under a negative polarity, for each converting group:
    each positive branch of the first converting stage is connected to all the positive branches of the second converting stage, and
    each negative branch of the first converting stage is connected to all the negative branches of the second converting stage.

2. The converter according to claim 1, wherein for each converting group the positive branches of the first converting stage are separate from the negative branches of the first converting stage.

3. The converter according to claim 1, wherein for each converting group the positive branches of the second converting stage are separate from the negative branches of the second converting stage.

4. The converter according to claim 1, wherein each output line is connected to:
    a first conductor connected to the positive branches of the second converting stage, and
    a second conductor connected to the negative branches of the second converting stage.

5. The converter according to claim 4, wherein one of the first and the second conductor has an inductance.

6. The converter according to claim 1, wherein the switches of the first converting stage and second converting stage are electronic switches.

7. The converter according to claim 6, wherein the electronic switches are thyristors; transistors; IGBT; GTO or IGCT.

8. The converter according to claim 1, wherein the number A is greater than the number B.

9. The converter according to claim 1, wherein a conductor in the second converting stage connects all of the positive branches of the second converting stage to each other.

10. The converter according to claim 1, wherein a conductor in the first converting stage connects all of the negative branches of the first converting stage to each other.

* * * * *